United States Patent [19]

Hasegawa

[11] Patent Number: 5,841,554
[45] Date of Patent: Nov. 24, 1998

[54] IMAGE PICKUP APPARATUS

[75] Inventor: Shizuo Hasegawa, Tokyo, Japan

[73] Assignee: Canon Kabushiki Kaisha, Tokyo, Japan

[21] Appl. No.: 781,929

[22] Filed: Jan. 8, 1997

Related U.S. Application Data

[63] Continuation of Ser. No. 380,800, Jan. 30, 1995, abandoned.

[30] Foreign Application Priority Data

Jan. 31, 1994 [JP] Japan .................................. 6-009874

[51] Int. Cl.$^6$ .................................................. H04N 1/195
[52] U.S. Cl. ...................... 358/514; 3585/512; 3585/513
[58] Field of Search ..................... 358/500, 501, 358/505, 512–515; 348/262, 265, 273, 280, 283; 250/208.1; H04N 1/195

[56] References Cited

U.S. PATENT DOCUMENTS

| | | | |
|---|---|---|---|
| 4,244,003 | 1/1981 | Poetsch et al. | 348/265 |
| 4,264,921 | 4/1981 | Pennington et al. | 358/314 |
| 4,691,114 | 9/1987 | Hasegawa et al. | 250/578 |
| 4,710,803 | 12/1987 | Suzuki et al. | 348/275 |
| 4,750,048 | 6/1988 | Satoh et al. | 358/287 |
| 4,930,006 | 5/1990 | Murayama et al. | 348/280 |
| 4,985,760 | 1/1991 | Maeshima et al. | 358/512 |
| 5,055,921 | 10/1991 | Usui | 358/512 |
| 5,361,145 | 11/1994 | Hasegawa | 358/514 |

FOREIGN PATENT DOCUMENTS 61-26363  2/1986  Japan .

*Primary Examiner*—Kim Yen Vu
*Attorney, Agent, or Firm*—Fitzpatrick, Cella, Harper & Scinto

[57] ABSTRACT

The present invention comprises a plurality of linear sensors having color filters in which at least one of the linear sensors includes image pickup devices of a plurality of lines. Each image pickup device in the same linear sensor receives a light transmitted through the same color filter. Outputs of the plurality of image pickup devices are synthesized, thereby improving a sensitivity.

20 Claims, 17 Drawing Sheets

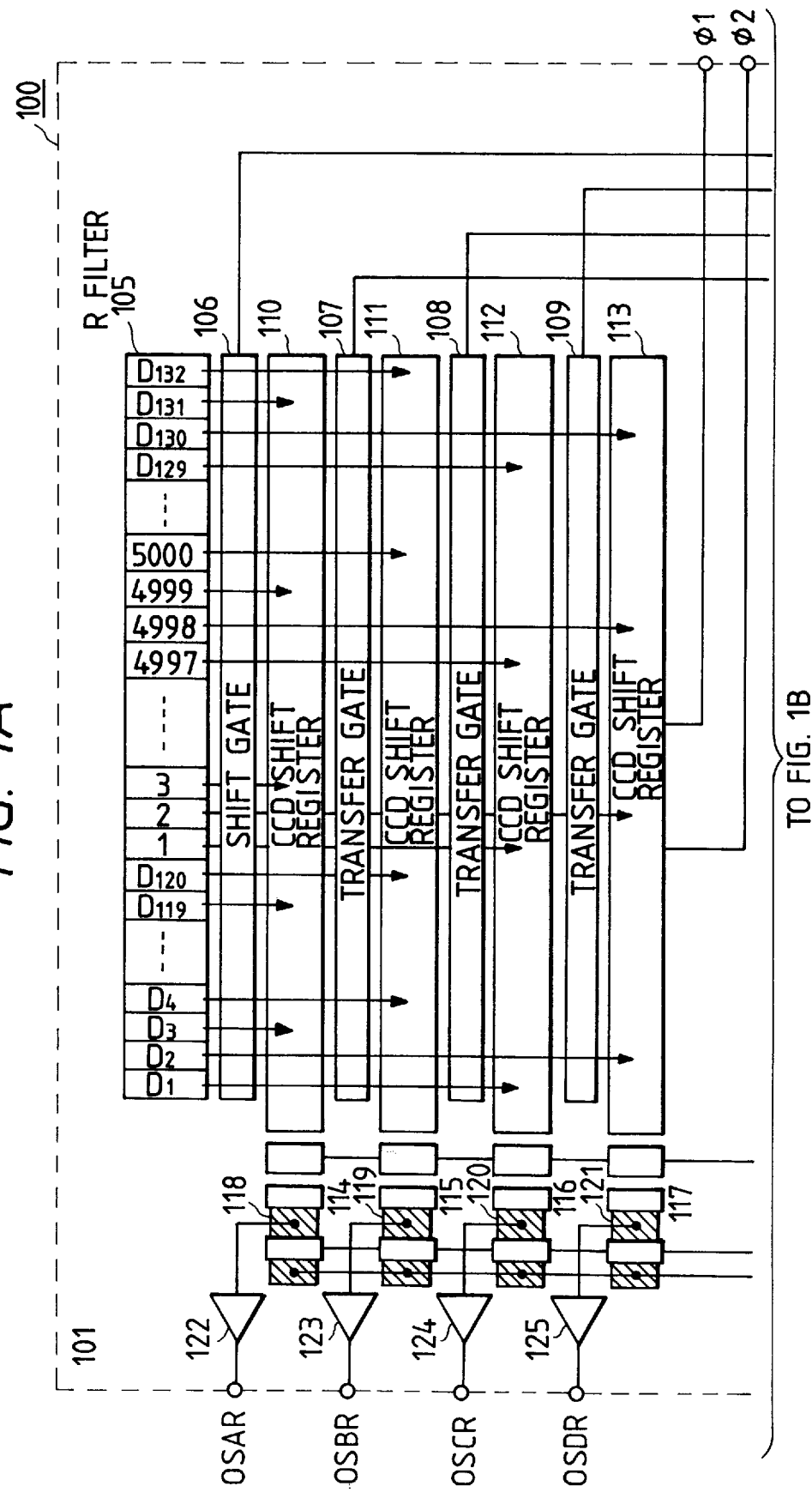

FROM FIG. 1A
TO FIG. 1C

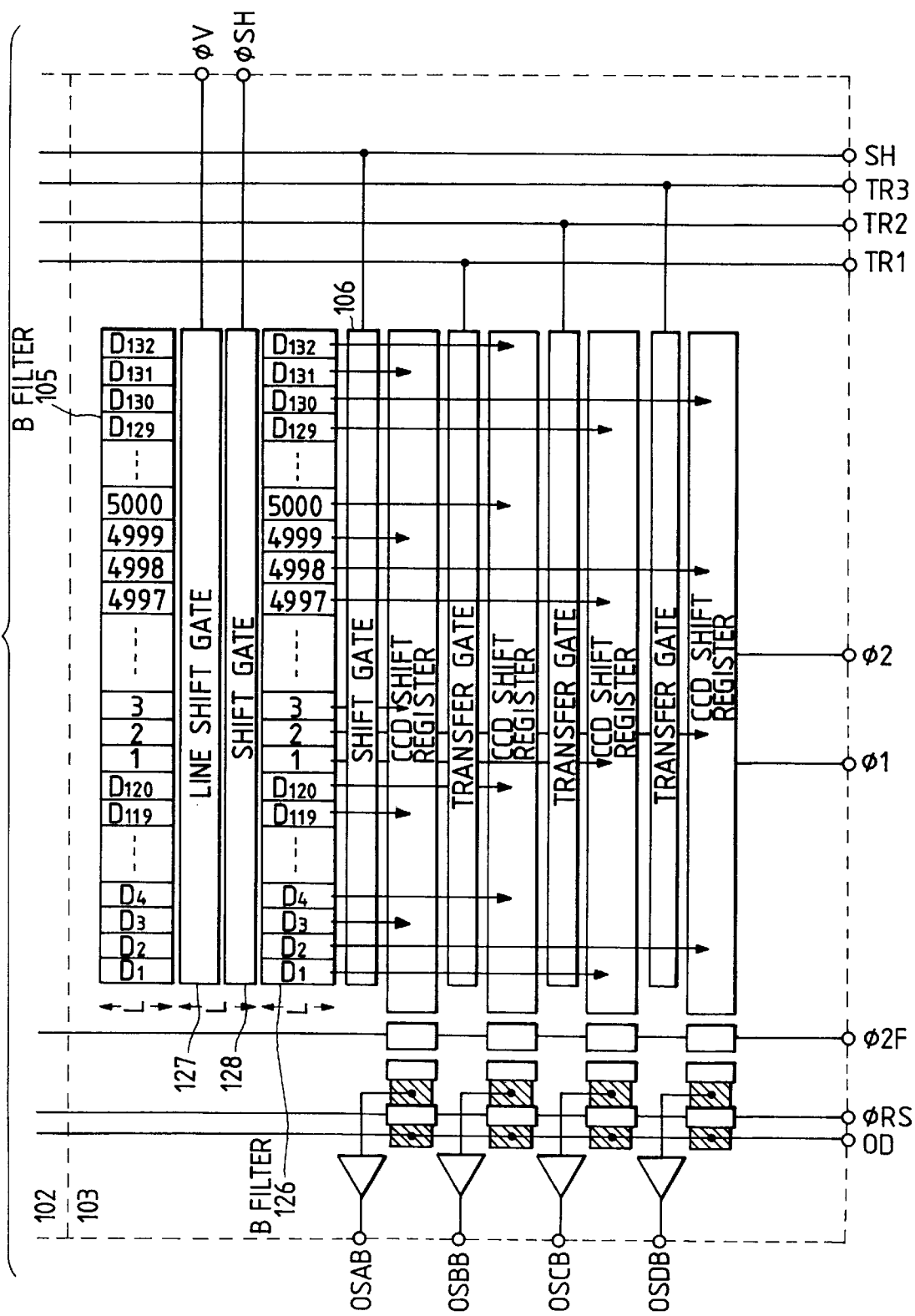

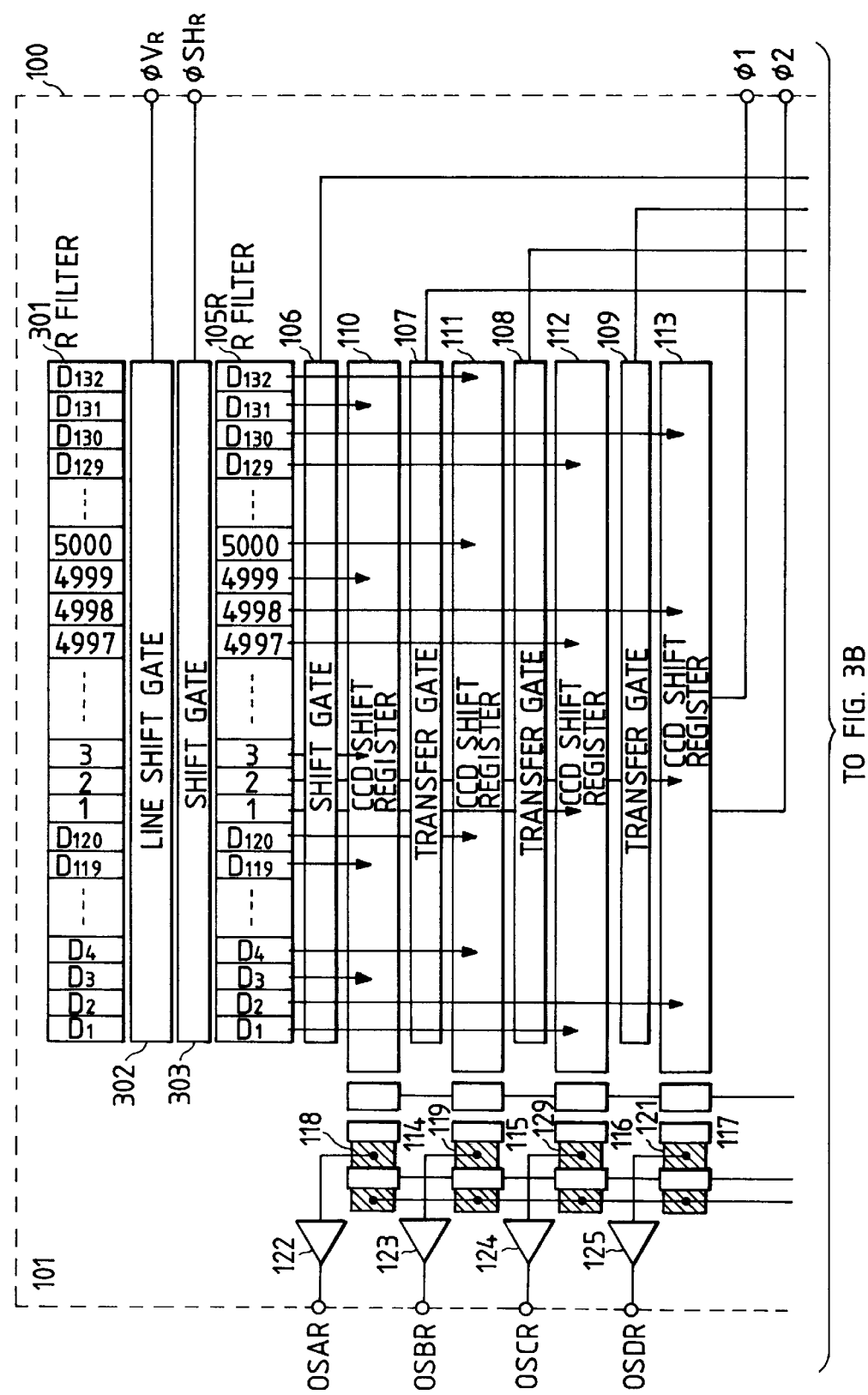

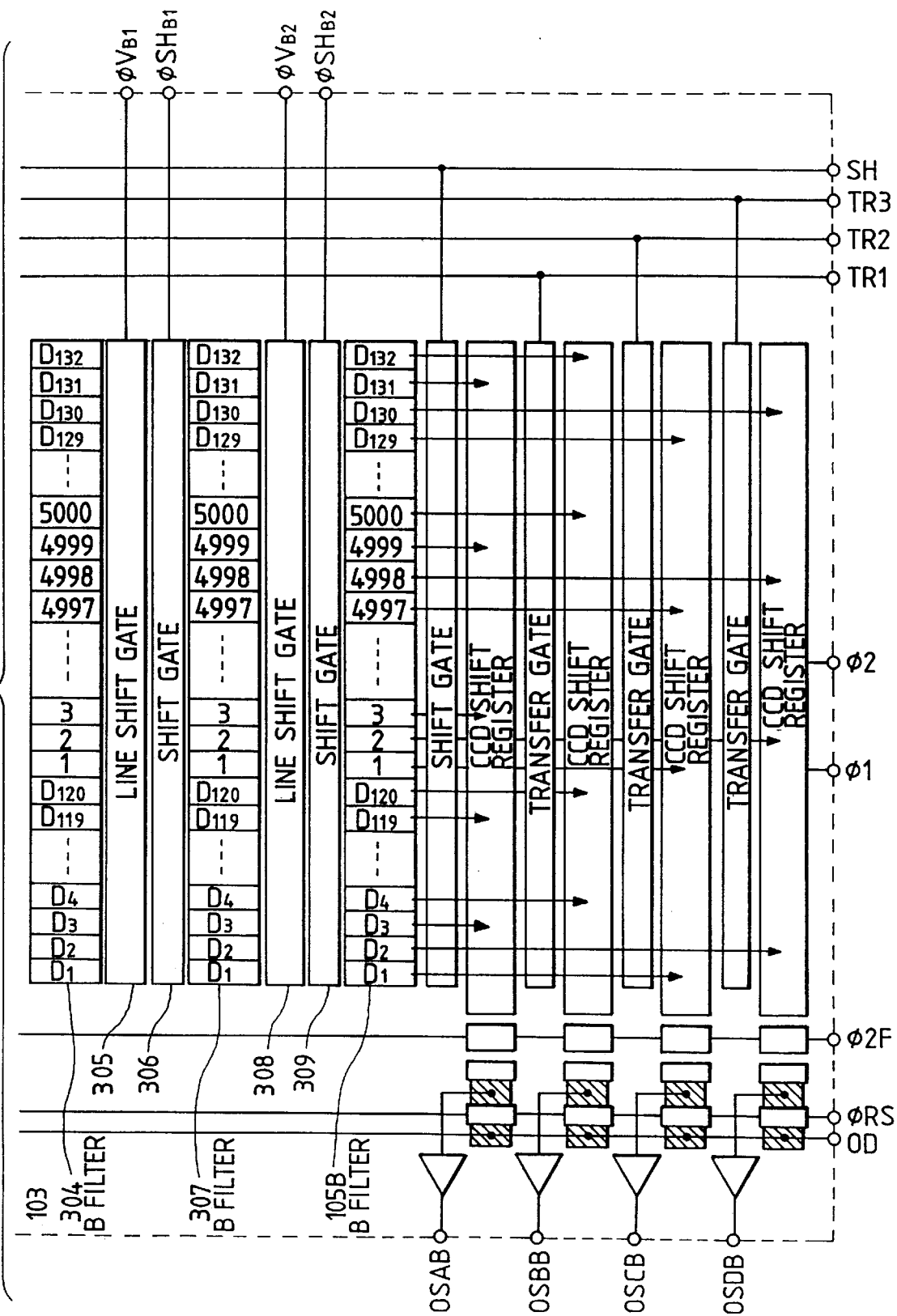

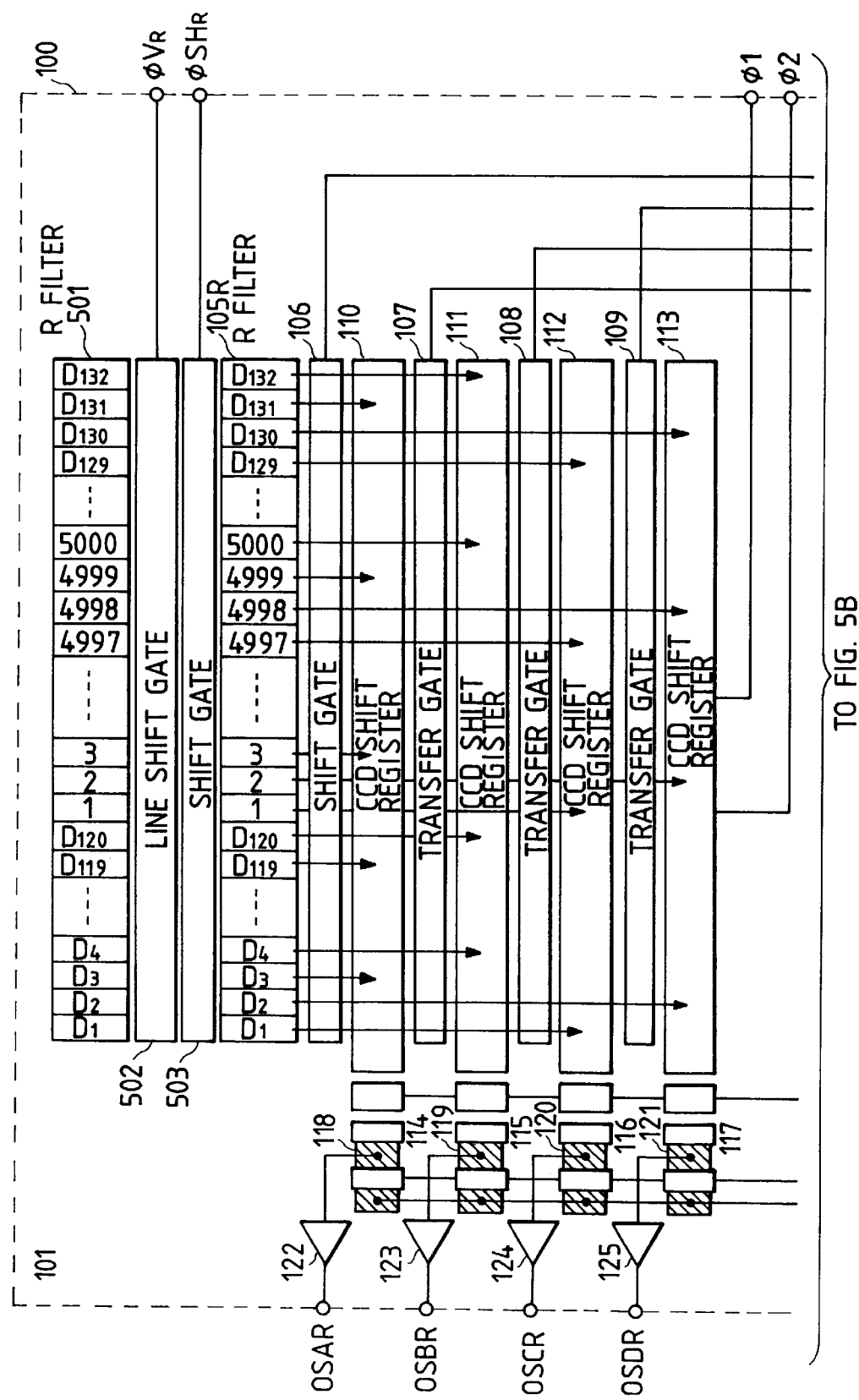

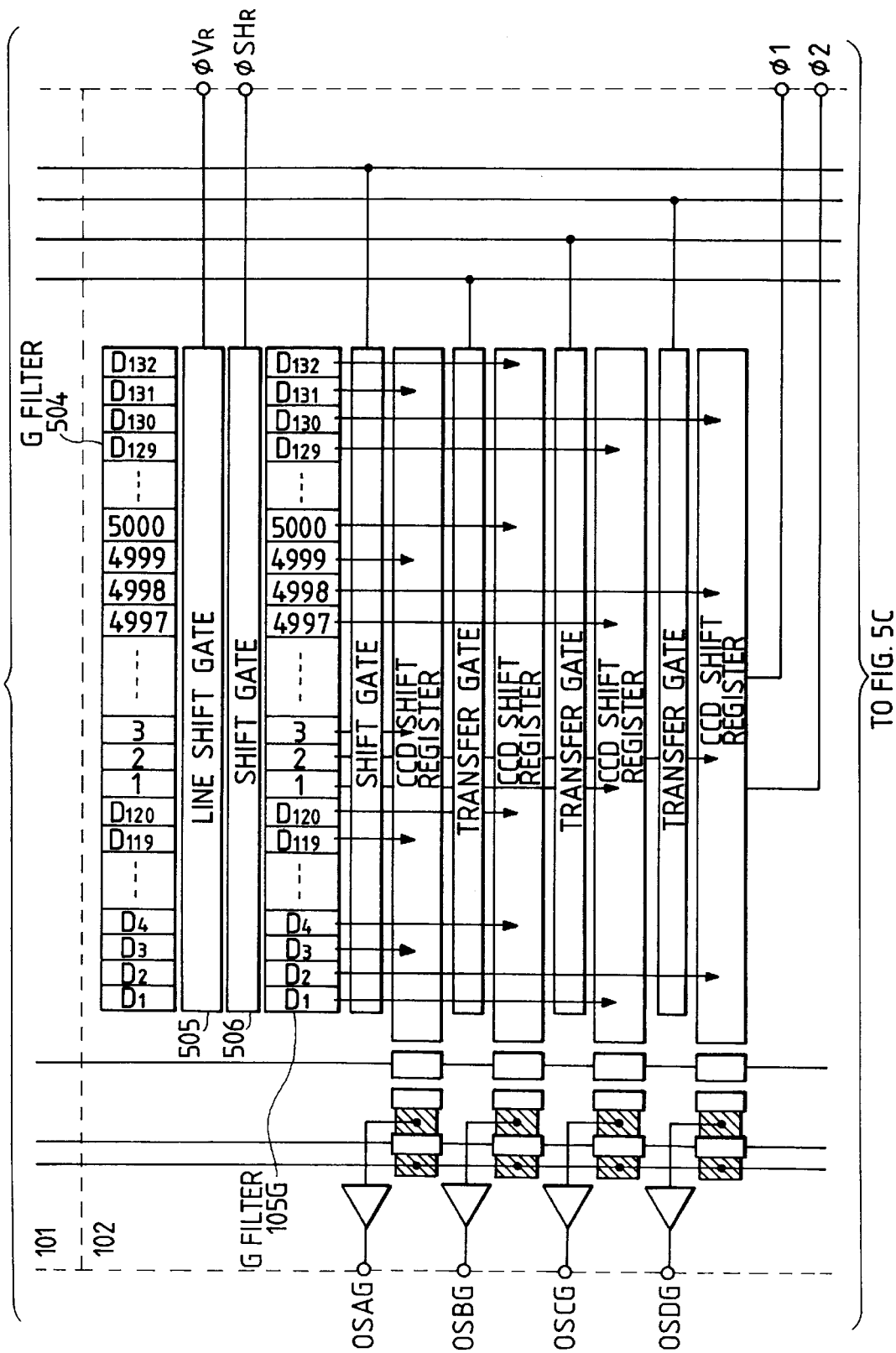

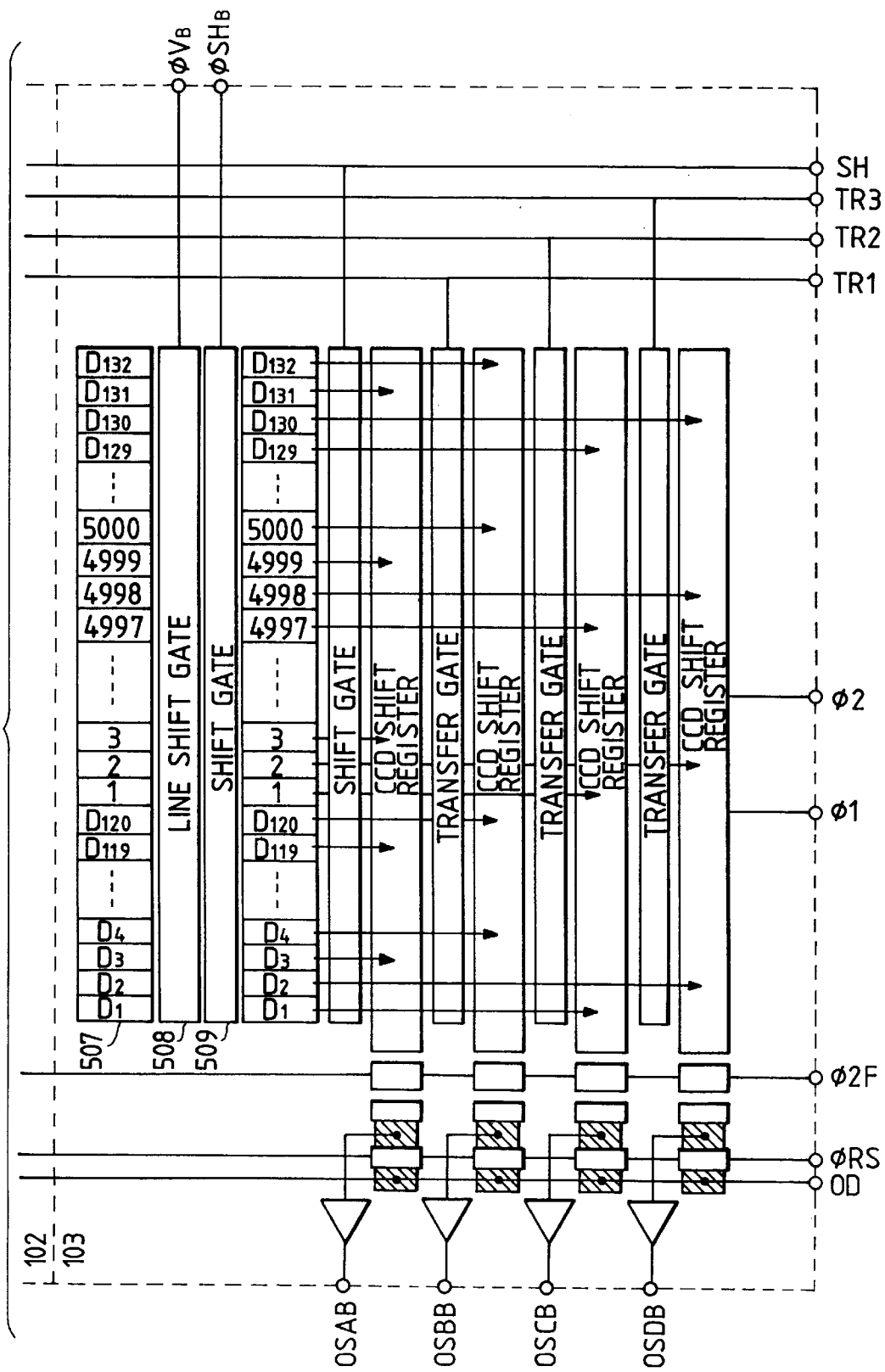

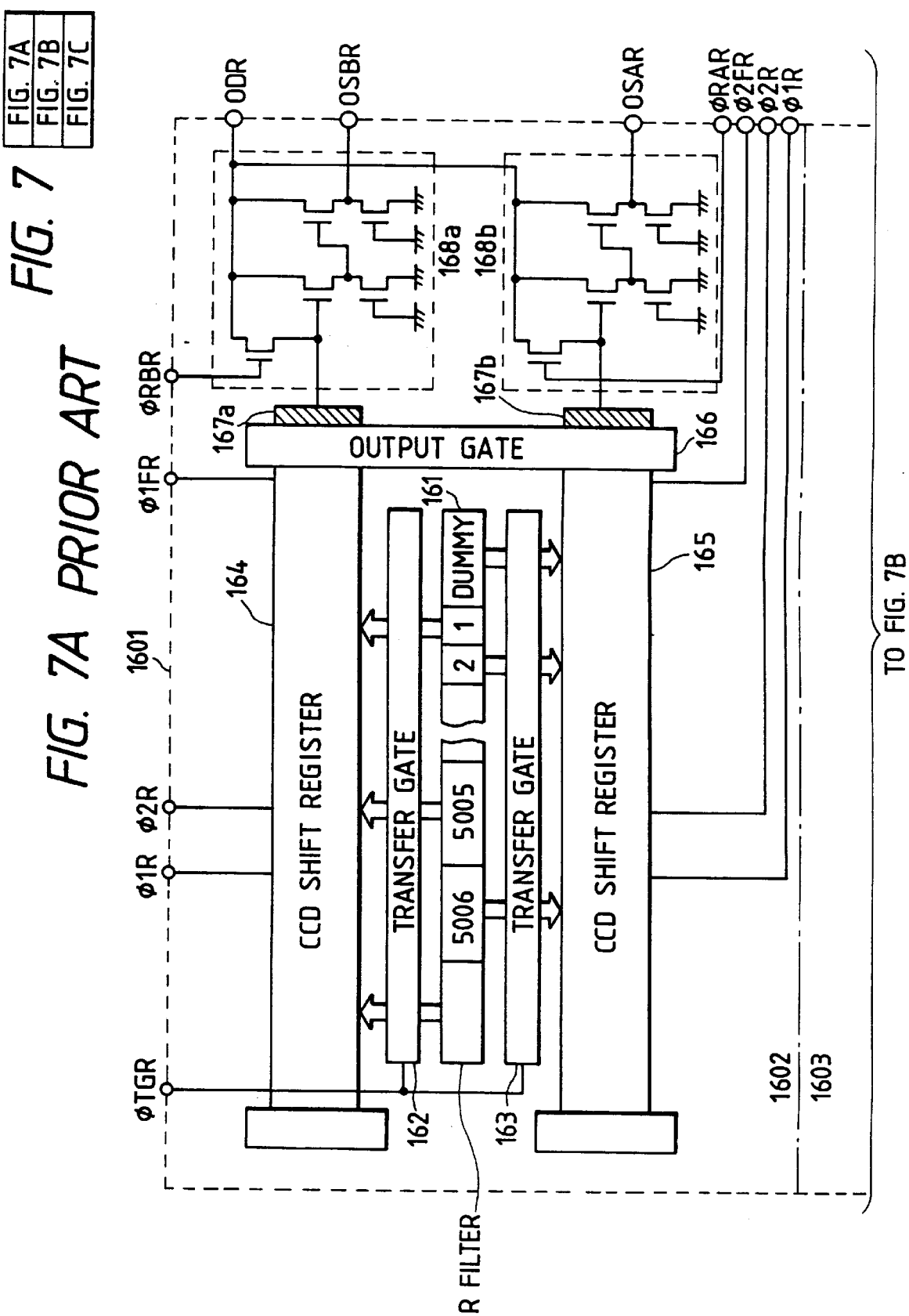

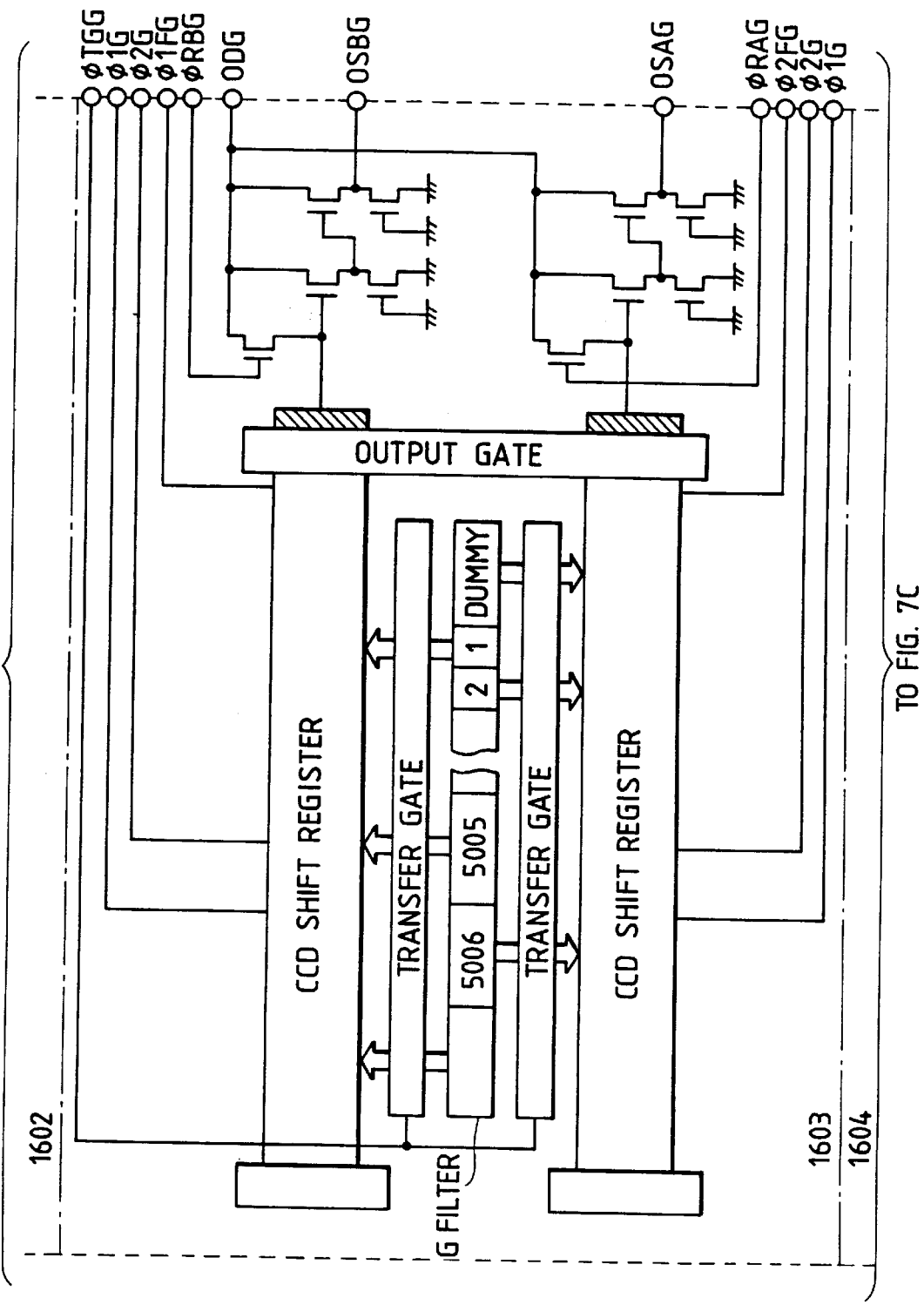

FROM FIG. 7B

SPECTRAL ENERGY DISTRIBUTION

IMAGE PICKUP APPARATUS

This application is a continuation of application Ser. No. 08/380,800 filed Jan. 30, 1995, now abandoned.

BACKGROUND OF THE INVENTION

1. Field of the Invention

The present invention relates to an image pickup apparatus for reading an image using a color image sensor and for converting the read image to an electric signal.

2. Related Background Art

In conventional apparatus such as an OCR, a video camera, FAX, a digital copying apparatus, or the like, there are full color reading systems such as (a) a light source switching system, (b) a prism separating system, (c) a color filter switching system, (d) an on-chip color filter system, and the like. It is, however, considered that the on-chip color filter system is optimum in terms of high speed reading and color separation precision.

FIGS. 7A to 7C show a constructional example of a color CCD linear image sensor of the conventional on-chip color filter system.

A color CCD linear image sensor 1601 according to the conventional example is constructed in a manner such that three CCD (charge coupled device) chips having on-wafer color filters of R, G, and B are arranged in parallel on the same wafer as shown in the diagram.

For instance, a three-line color CCD linear image sensor comprising CCD image sensors (chips) 1602 to 1604 is shown in FIGS. 7A to 7C.

In the diagram, reference numeral 161 denotes a photo sensing section to photoelectrically convert light in accordance with the quantity of light which enters (reference numerals are written with respect to only R and the same shall also apply to G and B). Color separation filters of R, G, and B are arranged on CCD sensor elements of the photo sensing sections 161 in an on-wafer manner. A head portion of the photo sensing section 161 has a light shielding pixel section in which a mask (light shielding film) made of aluminum or the like is arranged on the photo sensing section 161, thereby shutting off the incident light and always obtaining an output in a dark state. Reference numerals 162 and 163 denote transfer gates to transfer charges stored in the photo sensing section 161 to CCD shift registers 164 and 165 in accordance with a shift gate pulse $\phi$TG. The charges stored in the even pixels of the photo sensing section 161 are transferred to each CCD shift register 165 for the even pixels by the transfer gate 163. On the other hand, the charges stored in the odd pixels of the photo sensing section 161 are transferred to each CCD shift register 164 for the odd pixels by the transfer gate 162.

The CCD shift registers 164 and 165 transfer the charges supplied from the photo sensing section 161 side to an output section and are 2-phase driven by driving clocks $\phi$1 ($\phi$1R, $\phi$1FR, $\phi$1G, $\phi$1FG, $\phi$1B, $\phi$1FB) and $\phi$2 ($\phi$2R, $\phi$2FR, $\phi$2G, $\phi$2FG, $\phi$2B, $\phi$2FB).

Reference numeral 166 indicates an output gate to transfer the charges from the CCD registers 164 and 165 to output capacitance sections 167a and 167b; 167a and 167b the output capacitance sections to convert the transferred charges into voltages; 168a and 168b two-stage source follower amplifiers to decrease an output impedance, thereby preventing noises from being mixed in an output signal.

An FDA (Floating Diffusion Amplifier) is constructed by the output capacitance sections 167a and 167b and the source follower amplifiers 168a and 168b.

OSAR, OSBR, OSAG, OSBG, OSAB, and OSBB denote signal output terminals; $\phi$RAR, $\phi$RBR, $\phi$RAG, $\phi$RBG, $\phi$RAB, and $\phi$RBB reset pulse terminals; $\phi$1R, $\phi$1G, $\phi$1B, $\phi$2R, $\phi$2G, and $\phi$2B CCD shift register clock terminals; $\phi$TGR, $\phi$TGG, and $\phi$TGB transfer gate clock terminals; and ODR, ODG, and ODB source follower amplifier drain terminals.

In the color image sensor 1601 constructed as mentioned above, the light which entered the photo sensing section 161 is converted to the charges proportional to the light quantity. The charges are transferred to the CCD shift registers 165 and 164 by the shift gate pulse $\phi$TG every even pixel and every odd pixel. The transferred charges are subsequently outputted one by one to the FDA through the output gate 166 in accordance with the driving clocks $\phi$1 and $\phi$2. The charge outputs are converted to the voltages by the output capacitance sections 167a and 167b in the FDA and are outputted through the two-stage source follower amplifiers 168a and 168b and the output terminals OSA and OSB, respectively.

According to the above conventional example, however, spectral characteristics as shown in FIG. 11 are integrally obtained on the basis of spectral transmissions of the color filters R, G, and B as shown in FIG. 8, a spectral energy distribution of a light source shown in FIG. 9, and the spectral transmission of an infrared absorbing filter (arranged at the whole surface of the image reading apparatus) in FIG. 10. There are the relations of (B–CCD)<(R–CCD)<(G–CCD) among the amounts of charges which are generated from photo diodes of the CCDs 1602, 1603, and 1604. The final sensitivities of the CCDs 1602, 1603, and 1604 are such that (B–CCD)<(R–CCD)<(G–CCD) in accordance with this order. For example, the sensitivities of the CDDs of R, G, and B are set to (R: 2.1 V/lx·sec), (G: 2.6 V/lx·sec), and (B: 0.86 V/lx·sec), respectively.

Since the sizes of the CCD registers 164 and 165 are ordinarily the same, the saturation output voltages of the CCDs 1602, 1603, and 1604 are equal.

In the case of actually using such a line color CCD linear sensor in an apparatus, the construction of the reading system is determined depending on the quantity of light needed to obtain the output voltage at which a necessary S/N ratio is obtained.

That is, the whole system is decided by the light quantity in which the output voltage of the (B–CCD) 1604 having the lowest sensitivity becomes a voltage at which the necessary S/N ratio is obtained.

For example, assuming that the necessary S/N ratio is set to 48 dB (256 levels) and a noise level from the CCD is set to 1 mV, the lowest output voltage is equal to 256 mV.

In the case where the output voltage of the (B–CCD) 1604 is equal to 256 mV, therefore, the output voltages of the (R–CCD) 1602 and (G–CCD) 1603 are as follows.

2.1(V/lx·sec)/0.86(V/lx·sec)×256 mV=625 mV 2.6(V/lx·sec)/0.86(V/lx·sec)×256 mV=774 mV In this instance, when it is assumed that the foregoing output voltage is obtained at a certain accumulating time $T_1$ ($\mu$sec), in case of considering that a reading speed of the image reading apparatus is raised, for example, in case of obtaining the reading speed that is twice as high as the normal reading speed, an accumulating time $T_2$ is equal to $T_1/2$ ($T_2=T_1/2$). The output voltages of the CCDs are as follows.

(B–CCD): 128 mV, (R–CCD): 312.5 mV, (G–CCD): 387 mV 48 dB is not obtained as an S/N ratio of the (B-CCD) 1604.

In case of correcting such values, the quantity of light must be raised to the value that is twice as large as the normal light quantity. However, since there is a problem such as an increase in temperature or the like of the apparatus, it is impossible to unconditionally double the light quantity. In order to construct the apparatus, the light quantity of the illumination has to be raised to a value such that a problem of an increase in temperature does not occur, and when the light quantity further lacks in such a situation, the user cannot help using the apparatus by reducing the S/N ratio of the B-CCD.

When the apparatus is used as mentioned above, a problem such that the image quality is deteriorated occurs.

It is an object of the invention to provide an image reading apparatus which can solve the problems as mentioned above and can obtain an image of a higher quality.

SUMMARY OF THE INVENTION

It is an object of the present invention to provide an image pickup apparatus which can obtain an image of a high quality.

Another object of the invention is to provide an image pickup apparatus in which an S/N ratio does not deteriorate due to a lack of an output signal level.

Still another object of the invention is to enable the sensitivity characteristics of every color in an image pickup apparatus to be preferably corrected.

To accomplish the above objects, according to an embodiment of the invention, there is provided an image pickup apparatus comprising: first sensors for photoelectrically converting a light transmitted through a color filter of a first color; second sensors for photoelectrically converting a light transmitted through a color filter of a second color different from the first color, in which the number of the second sensors is larger than that of the first sensors; and adding means for adding outputs of the second sensors. By constructing the apparatus as mentioned above, a signal of a color having a relatively low sensitivity can be obtained without deteriorating a S/N ratio.

According to another embodiment of the invention, there is provided an image pickup apparatus comprising: first sensors for photoelectrically converting a light transmitted through a color filter of a first color; second sensors for photoelectrically converting a light transmitted through a color filter of a second color different from the first color, in which the number of the second sensors is larger than that of the first sensors; first adding means for adding outputs of the second sensors; third sensors for photoelectrically converting a light transmitted through a color filter of a third color different from the first and second colors, in which the number of the third sensors differs from those of the first and second sensors; and second adding means for adding outputs of the third sensors. Sensitivity characteristics for every color can be preferably corrected by constructing the apparatus as mentioned above.

According to another embodiment of the invention, there is provided an image pickup apparatus which is constructed in a manner such that a plurality of linear image sensors each comprising photoelectric converting means for converting a light from an object to an electric signal, reading means for reading out the signal converted to the electric signal by the photoelectric converting means, and color filters which are formed on the photoelectric converting means and color separate the light from the object are formed on a same chip, wherein the apparatus has a plurality of photoelectric converting means of the linear image sensors each having a plurality of lines corresponding to at least one color filter, spaces each having a width that is an integer times as wide as a width of the photoelectric converting means are being provided between the plurality of lines, and the apparatus has synthesizing means for synthesizing output signals of the photoelectric converting means of the plurality of lines. By constructing the apparatus as mentioned above, a deterioration of the image quality which occurs by the deterioration in S/N ratio due to the insufficient output signal level can be prevented and an image of a high quality can be obtained.

According to still another embodiment of the invention, there is provided an image pickup apparatus which is constructed in a manner such that a plurality of linear image sensors each comprising photoelectric converting means for converting a light from an object to an electric signal, reading means for reading out the signal converted to the electric signal by the photoelectric converting means, and color filters which are formed on the photoelectric converting means and color separate the light from the object are formed on a same chip, wherein the apparatus has a plurality of photoelectric converting means of the linear image sensors each corresponding to at least one color filter by a plurality of lines, synthesizing means for synthesizing output signals of the photoelectric converting means of the plurality of lines, and accumulating means for temporarily accumulating the output signals from the photoelectric converting means into portions among the photoelectric converting means. With such a construction, a deterioration of the image quality due to a decrease in S/N ratio can be prevented and a high image quality can be realized by simply performing the addition of the output signals.

The above and other objects and features of the present invention will become apparent from the following detailed description and appended claims with reference to the accompanying drawings.

BRIEF DESCRIPTION OF THE DRAWINGS

FIGS. 1A to 1C, when combined as shown in FIG. 1, show a constructional diagram of a color CCD linear image sensor as an image reading apparatus according to the first embodiment;

FIGS. 3A to 3C, when combined as shown in FIG. 3, show a constructional diagram of a color CCD linear image sensor according to the second embodiment;

FIGS. 5A to 5C, when combined as shown in FIG. 5, show a constructional diagram of a color CCD linear image sensor according to the third embodiment;

FIGS. 7A to 7C, when combined as shown in FIG. 7, show a constructional diagram of a conventional color CCD linear image sensor;

DESCRIPTION OF THE PREFERRED EMBODIMENTS

Embodiments of the invention will now be described in detail hereinbelow with reference to the drawings.

Figure 1B:
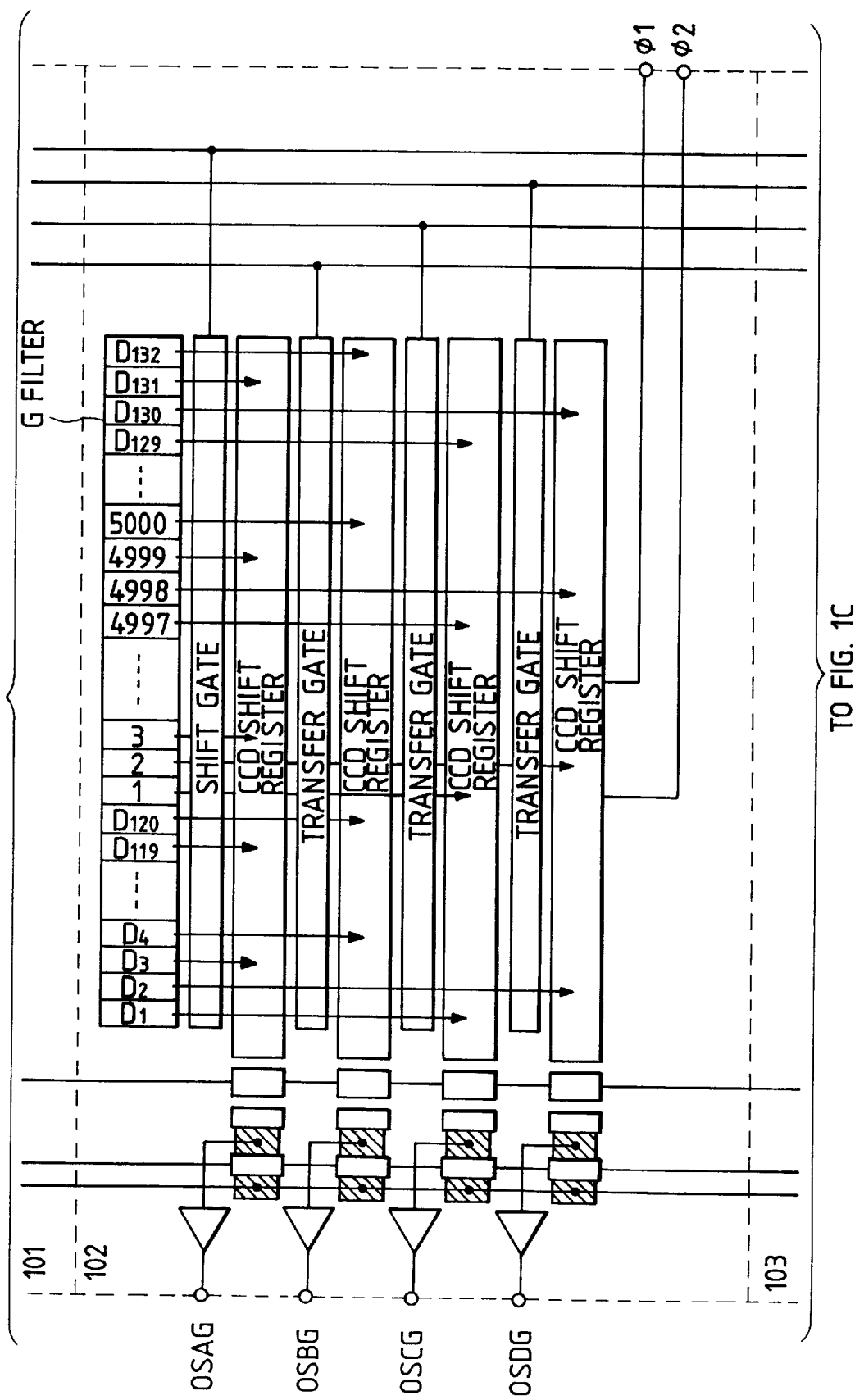

FIGS. 1A to 1C show a circuit constructional diagram of a color CCD linear image sensor in an image pickup apparatus according to the first embodiment of the invention. In the diagram, reference numeral 100 denotes a color CCD linear image sensor; and 101, 102, and 103 indicate (R–CCD), (G–CCD), and (B–CCD) in which on-chip color separating filters of R, G, and B are arranged.

Reference numeral 105 denotes a photodiode as a photo sensing section to photoelectrically convert an incident light quantity (reference numerals are written with respect to only R and the same shall also apply to G and B, and a further explanation will be made hereinlater with respect to B).

The photo sensing section 105 comprises: light shielding pixel sections ($D_1$ to $D_{120}$) in each of which an aluminum mask is arranged in a head portion thereof, thereby shutting off the incident light and always obtaining an output in a dark state; effective pixel sections (1 to 5000) in which color filters are directly formed on the photodiode; and post dummy pixel sections ($D_{121}$ to $D_{132}$).

Reference numeral 106 denotes a shift gate which functions to transfer charges accumulated in the photo sensing section 105 to CCD shift registers 110 to 113 in accordance with a shift gate pulse SH.

Reference numerals 107, 108, and 109 denote transfer gates to transfer the charges supplied by the shift gate 106 to the CCD shift registers 111, 112, and 113 in accordance with transfer gate pulses TR1, TR2, and TR3.

That is, among the pixels transferred by the shift gate 106, the pixels $D_{3+4m}$ (m=0, 1, 2, . . . 32) and (3+4m) (m=0, 1, . . . 1249) are transferred to the CCD shift register 110 and the pixels $D_{4m}$ (m=1, 2, . . . 33) and (4m) (m=1, 2, . . . 1250) are transferred to the CCD shift register 111 through the CCD shift register 110 and the transfer gate 107 in accordance with the transfer gate pulse TR1.

Further, the pixels $D_{1+4m}$ (m=0, 1, . . . 32) and (1 +4m) (m=0, 1, . . . 1244) are transferred to the CCD shift register 112 through the CCD shift register 110, transfer gate 107, CCD shift register 111, and transfer gate 108 in accordance with the transfer gate pulses TR1 and TR2.

The pixels $D_{2+4m}$ (m=0, 1, . . . 32) and (2+4m) (m=0, 1, . . . 1249) are transferred to the CCD shift register 113 through the CCD shift registers 110, 111, and 112 and the transfer gates 107, 108, and 109 in accordance with the transfer pulses TR1, TR2, and TR3.

The CCD shift registers 110 to 113 transfer the charges supplied from the photo sensing section 105 to an output section and are two-phase driven by the driving clocks $\phi 1$, $\phi 2$, and $\phi 2F$.

Reference numerals 114 to 117 denote output gates which function to supply the charges from the CCD shift registers 110 to 113 to floating diffusion regions (output capacitance sections) 118 to 121. The floating diffusion regions (output capacitance sections) 118 to 121 convert the supplied charges to voltages.

Reference numerals 122 to 125 denote source follower amplifiers (amplifiers) each having the function of decreasing an output impedance, thereby preventing noises from being mixed with an output signal.

OSAR, OSBR, OSCR, and OSDR denote a (4m+3) pixel output signal, a (4m+4) pixel output signal, a (4m+2) pixel output signal, and a (4m+1) pixel output signal (m=0, 1, . . . ) of the R signal, respectively.

$\phi RS$ denotes a reset pulse; $\phi 1$, $\phi 2$, and $\phi 2F$ the CCD shift register clocks; SH the shift gate clock; TR1, TR2, and TR3 the transfer gate clocks; and OD a drain.

In this instance, a part of the construction of the (B–CCD) 103 differs from those of the (R–CCD) 101 and (G–CCD) 102.

Namely, a line shift gate 127 for temporarily accumulating the charges generated in the photodiode 105 in accordance with a line shift gate clock $\phi V$ and a shift gate 128 for transferring the charges accumulated in the line shift gate 127 to a second photodiode 126 in accordance with a shift gate clock $\phi SH$ are provided between the photodiode 105 and the shift gate 106.

A space having only a width (n×L) that is an integer times as wide as a width L of almost one line of the photodiode 105 is provided in a portion between the photodiodes 105 and 126.

The reason why such a space is provided is to match sampling pitches of the photodiodes 105 and 126 when sub-scanning is executed in the direction perpendicular to the longitudinal direction of the photodiode.

According to the first embodiment and the second and third embodiments, which will be described hereinlater, since the accumulating section is provided in the space having the width of (n×L), the signal process for matching the timings later can be easily executed and a charge transfer (movement) efficiency from the photodiode 105 to the photodiode 126 can be improved. It will be obviously understood that it is not always necessary to set the width of the second diode 126 to L.

Figure 2:
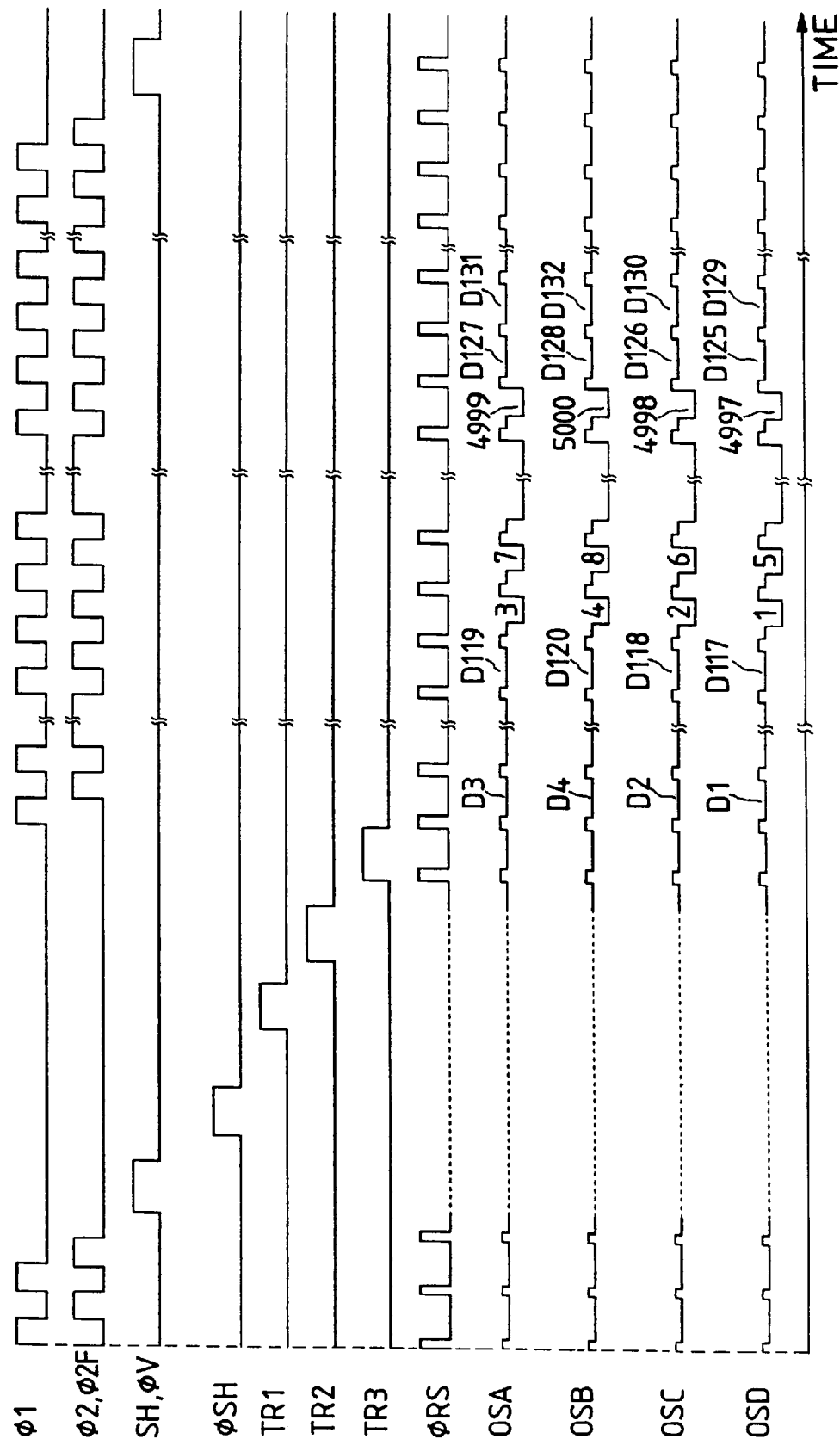
FIG. 2 is a timing chart of the first embodiment.

FIG. 2 shows timings of the driving clocks in FIGS. 1A to 1C. In the color CCD linear image sensor 100 constructed as mentioned above, the reflected light from the original which entered the photo sensing section 105 is color separated to three colors of R, G, and B by the color filters on the photo sensing section and is converted to the charges proportional to the light quantity in the pixels corresponding to various color filters.

The charges are transferred to the CCD shift registers 110, 111, 112, and 113 by the shift gate pulse SH and the transfer gate pulses TR1, TR2, and TR3 in the (R–CCD) 101 and (G–CCD) 102. In the (B–CCD) 103, however, the charges are accumulated in the line shift gate 127 by the line shift gate pulse $\phi V$ for a period of time of 1 H (horizontal synchronous interval), namely, for one period of SH or $\phi V$ and are transferred to the photo sensing section 126 by the shift gate pulse $\phi SH$ for the next 1 H and are synthesized with the charges which are generated in the photo sensing section 126. After that, the synthesized charges are transferred to the CCD shift registers 110, 111, 112, and 113 by the shift gate pulse SH and transfer gate pulses TR1, TR2, and TR3in a manner similar to those in the (R–CCD) 101 and (G–CCD) 102.

The transferred charges are subsequently outputted to the floating diffusion regions 118 to 121 through the output gates 114 to 117 bit by bit in accordance with the driving clocks $\phi 1$, $\phi 2$, and $\phi 2F$ at the timings shown in FIG. 2. The charge outputs are converted to the voltages and are outputted through the source follower amplifiers 122 to 125 and output terminals (OSA to OSD). In this period of time, the image pickup apparatus and the object such as an original or the like are relatively moved one pitch (=L) every 1 H in the sub-scanning direction (direction perpendicular to the longitudinal direction of the line sensor). The signal outputted from the output terminals (OSA to OSD) are processed by a memory in a signal processing circuit (not shown) while matching the timings. The process in this case is also similarly executed in the second and third embodiments.

Figure 3B:
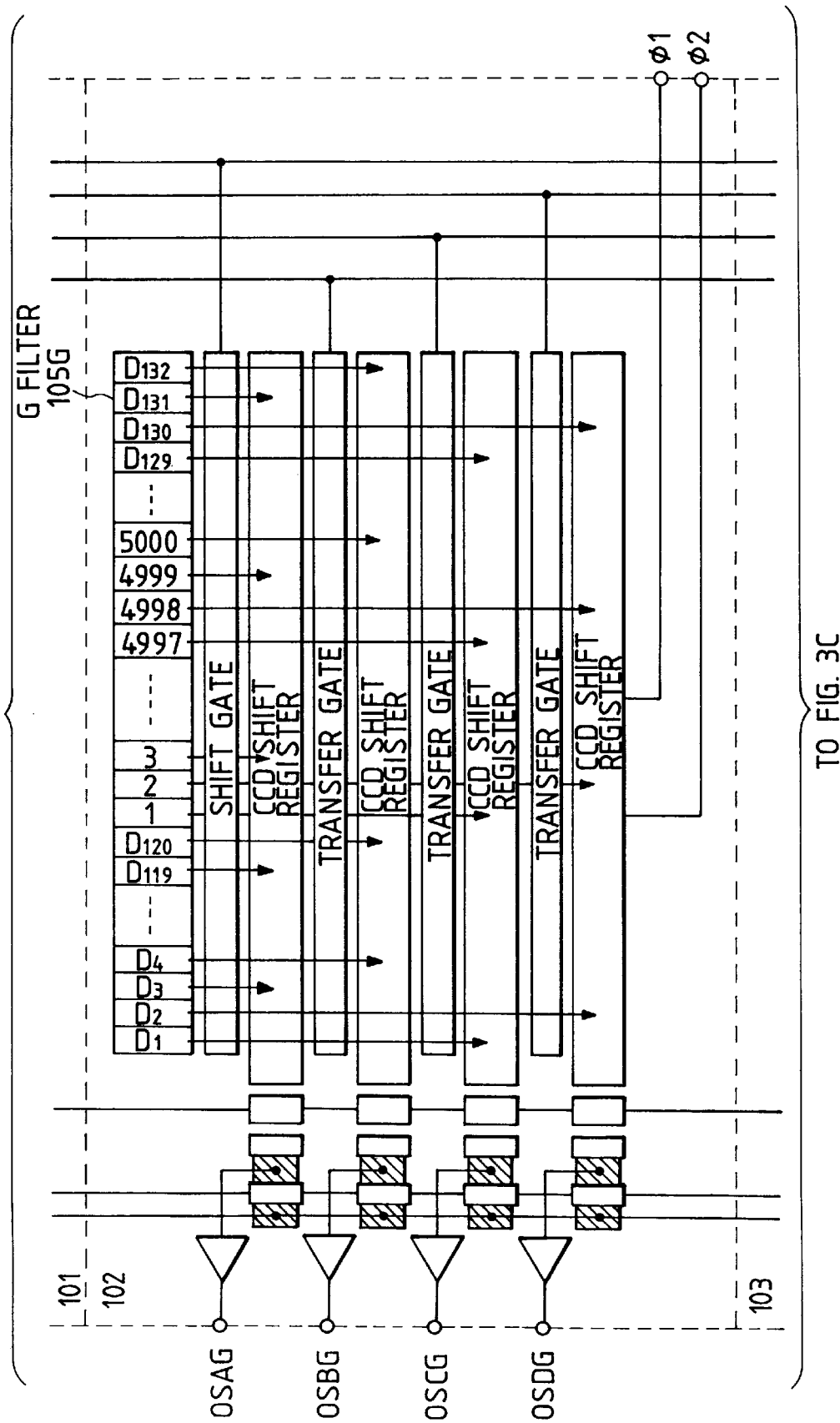

FIGS. 3A to 3C show the second embodiment.

In the foregoing first embodiment, the second photodiode 126 is provided for only the (B–CCD) 103 having the lowest sensitivity and the sum of the charges generated in the first and second photodiodes, namely, the output voltage that is about twice as high as the output voltage in the case where only the first photodiode exists is generated to the output terminals OSAB, OSBB, OSCB, and OSDB of the (B–CCD) 103.

Figure 7C:
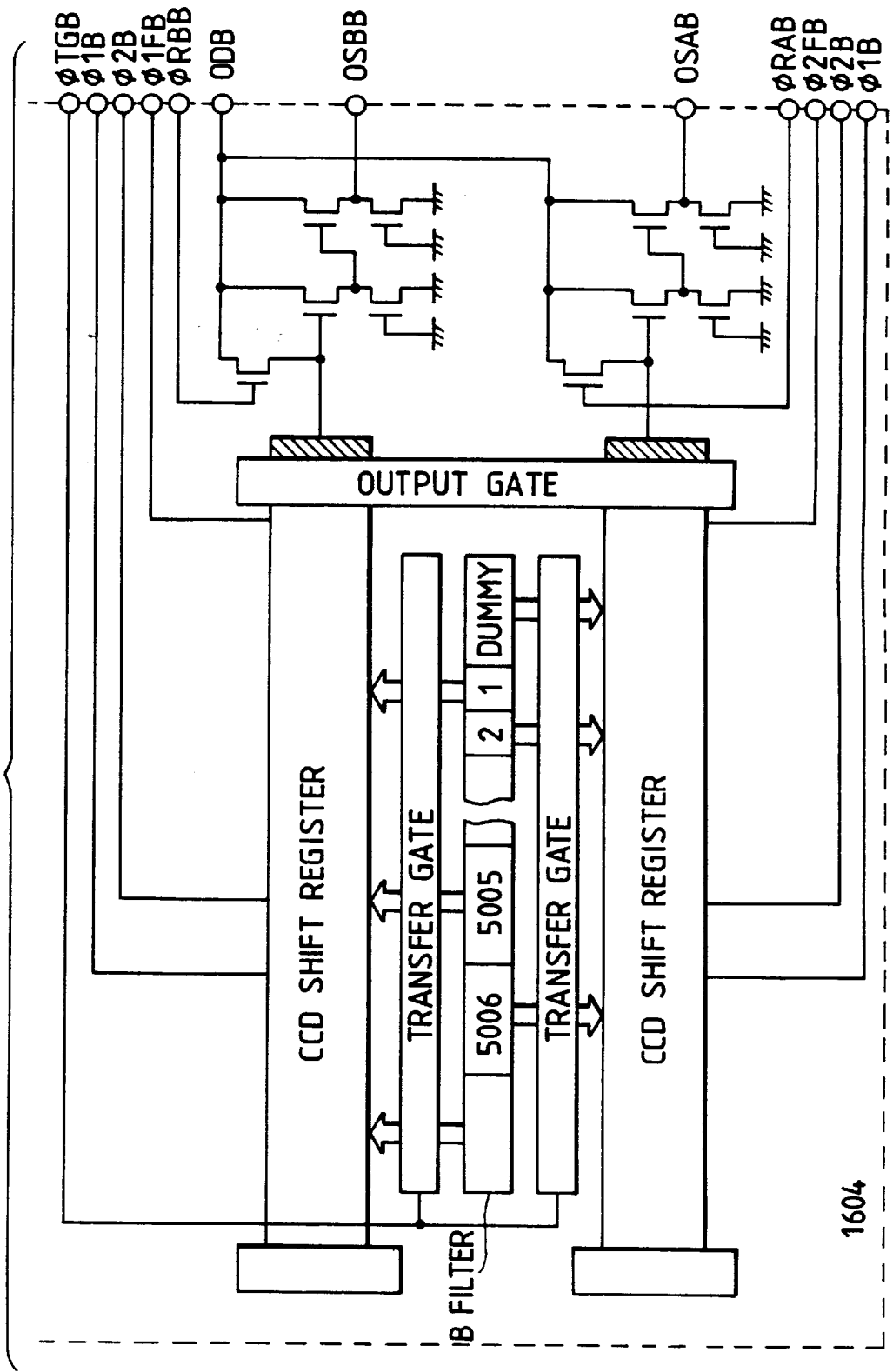
Figure 8:
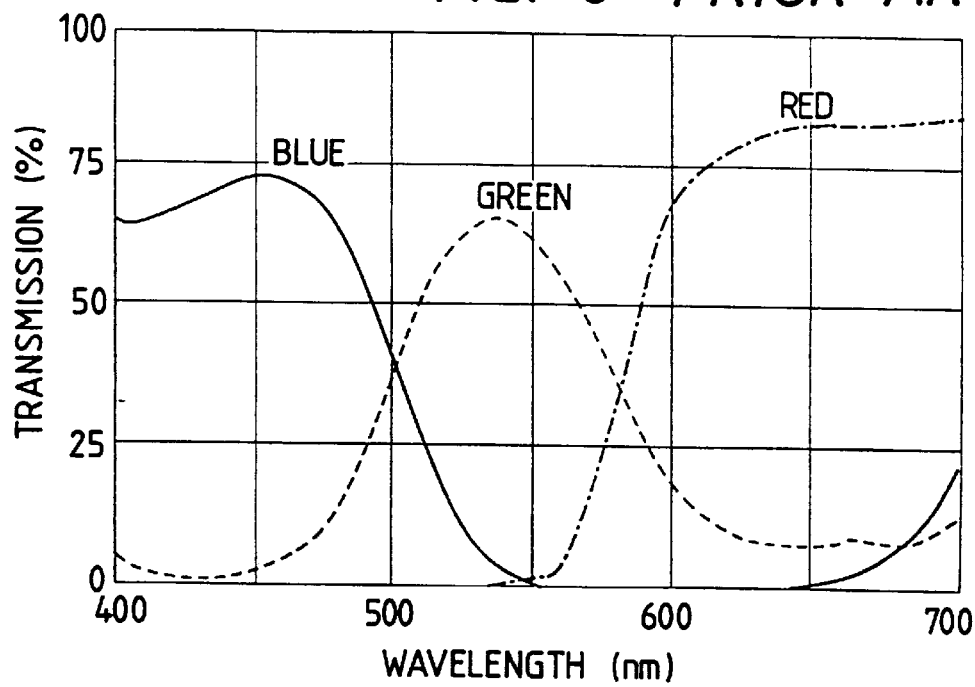
FIG. 8 is a diagram of spectral transmission characteristics of color filters of the conventional color CCD linear image sensor.
Figure 9:
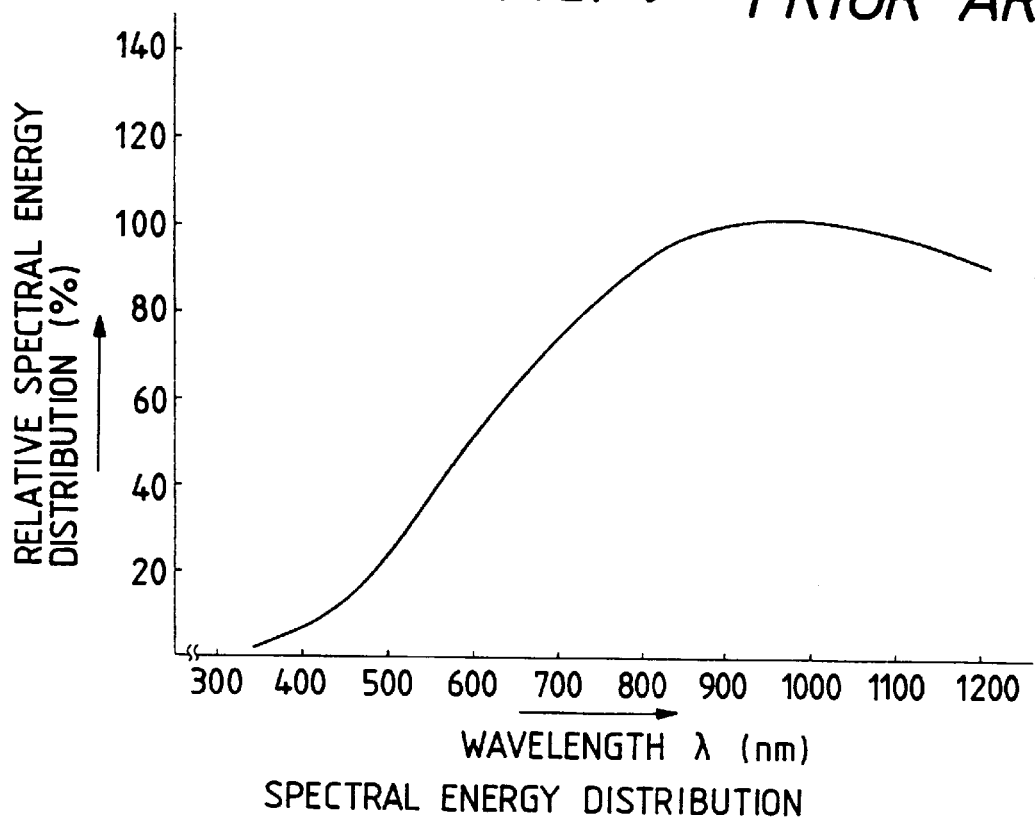
FIG. 9 is a diagram of spectral energy distribution characteristics of a light source which is used in the conventional image pickup apparatus.
Figure 10:
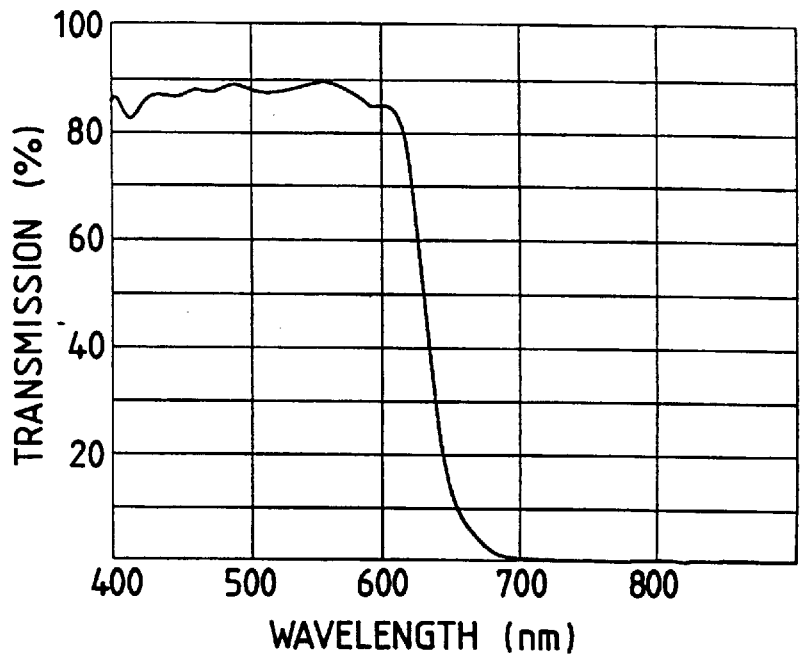
FIG. 10 is a diagram of spectral transmission characteristics of an infrared absorption filter which is used in the conventional image reading apparatus.
Figure 11:
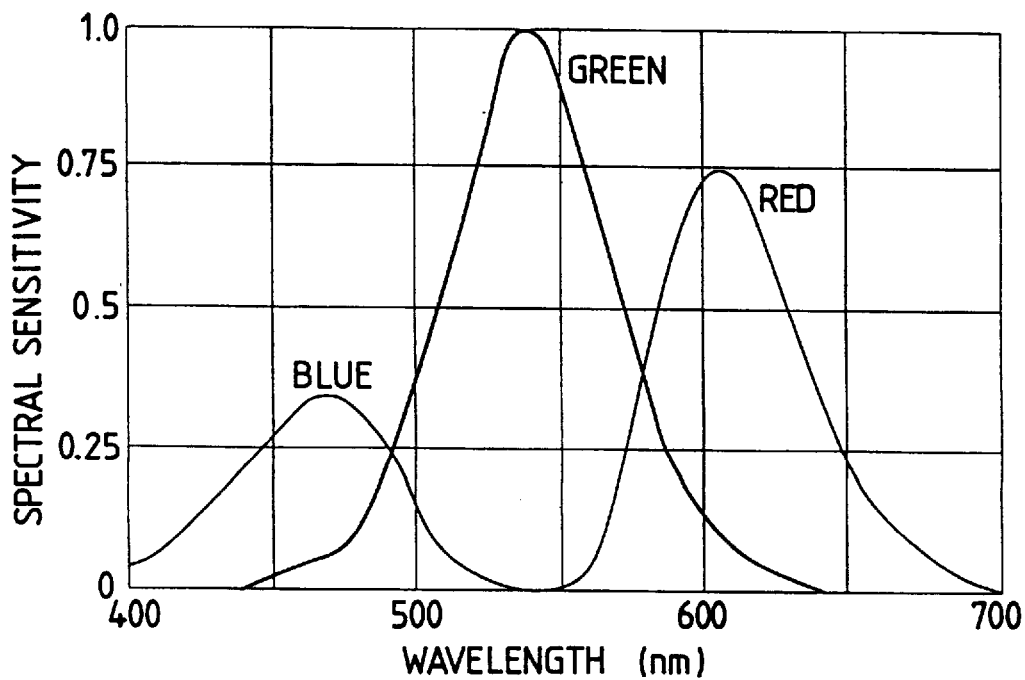
FIG. 11 is a diagram of integrated spectral characteristics of the conventional image reading apparatus.

In the second embodiment, however, the apparatus has a number of photodiodes that is almost inversely proportional to the integrated sensitivity (R: 2.1 V/lx·sec, G: 2.6 V/lx·sec, B: 0.86 V/lx·sec) of each CCD of R, G, and B in, for example, the conventional example of FIGS. 7A to 7C.

That is, a photodiode 105G of the (G–CCD) 102 exists in one line and in a manner similar to the conventional example. In the (R–CCD) 101, however, in addition to a conventional photodiode 105R, a second photodiode 301, a line shift gate 302 for temporarily accumulating the charges generated in the second photodiode 301, and a shift gate 303 for transferring the charges accumulated in the line shift gate 302 to the first photodiode 105R in accordance with a shift clock $\phi SH_R$ are added. In the embodiment, a width of an interval between the photodiode 105R and the shift gate 301 is an integer times as large as the width of almost one line of the photodiode 105R. In the (B–CCD) 103, in addition to the conventional photodiode 105B, second and third photodiodes 304 and 307, a line shift gate 305 for temporarily accumulating the charges generated in the second photodiode 304 in accordance with a line shift clock $\phi V_{B1}$, a shift gate 306 for transferring the charges accumulated under the line shift gate 305 to a second photodiode 307 in accordance with a shift clock $\phi SH_{B1}$, a line shift gate 308 for temporarily accumulating the charges generated in the second photodiode 307 in accordance with a line shift clock $\phi V_{B2}$, and a shift gate 309 for transferring the charges accumulated under the line shift gate 308 to the first photodiode 105B in accordance with a shift clock $\phi SH_{B2}$ are added.

The (R–CCD) 101 has, therefore, the sensitivity corresponding to the photodiodes of as many as two lines, namely, [2.1(V/lx·sec)×2=4.2 V/lx·sec]. The (B–CCD) 103 has the sensitivity corresponding to the photodiodes of three lines, namely, [0.86(V/lx·sec)×3=2.58 V/lx·sec].

Since the component elements written in the other embodiments are the same as those of the first embodiment, their explanations are omitted in the embodiments.

Figure 4:
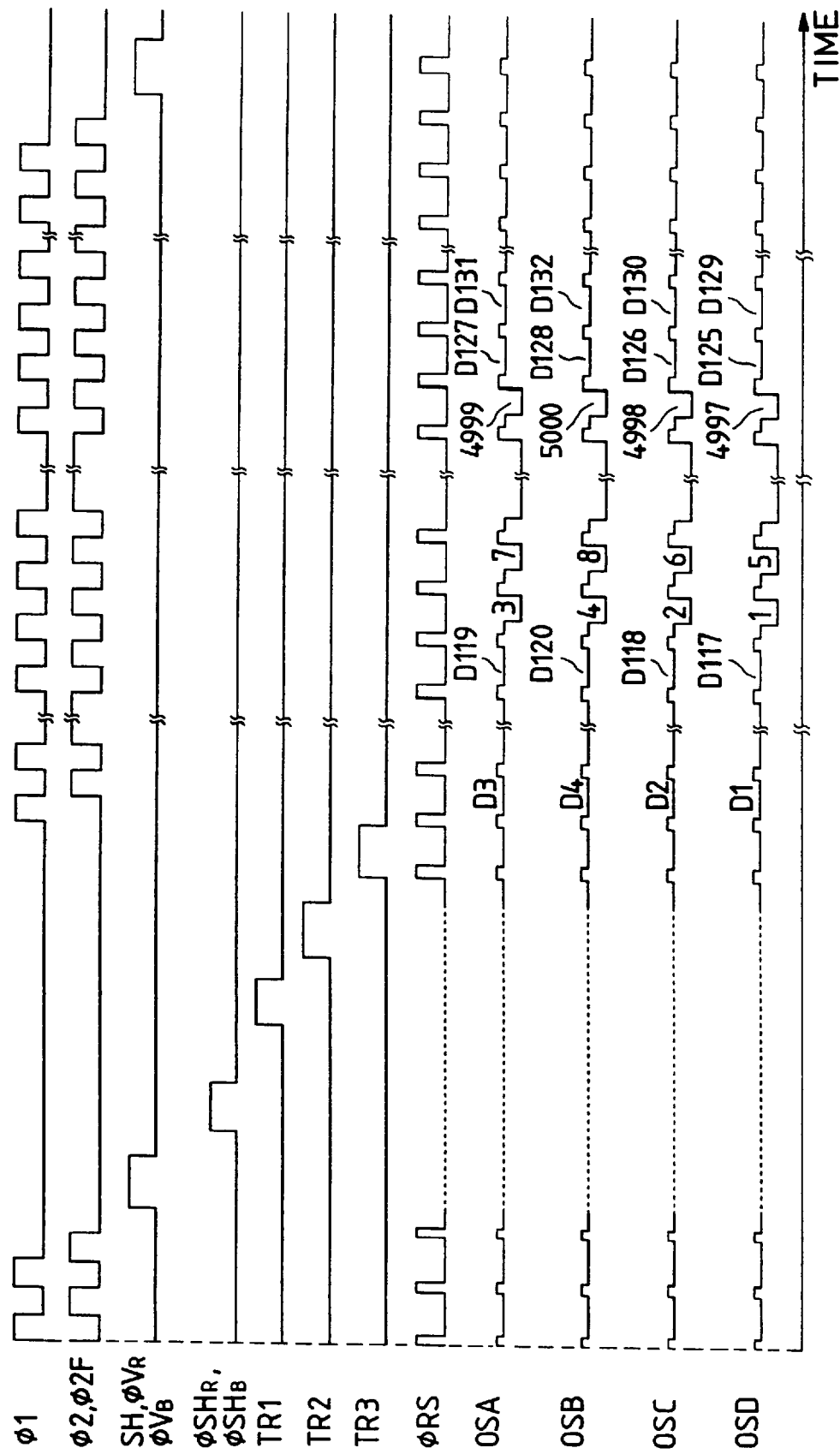
FIG. 4 is a timing chart of the second embodiment.

FIG. 4 shows timings of the driving clocks in FIG. 3. In the color CCD linear image sensor 100 constructed as mentioned above, the reflected light from the original which entered the photo sensing section 105 is color separated to three colors of R, G, and B by the color filters on the photo sensing section and are converted to the charges proportional to the light quantity in the pixels each corresponding to the respective color filters.

The charges are transferred to the CCD shift registers 110, 111, 112, and 113 by the shift gate pulse SH and transfer gate pulses TR1, TR2, and TR3 in the (G–CCD) 102. In the (R–CCD) 101, however, the charges are accumulated under the line shift gate for a period of time of 1 H (horizontal synchronous interval) by a line shift gate pulse $\phi V_R$ and are transferred to the photo sensing section 105R by the shift gate pulse $\phi SH_R$ for a period of time of the next 1 H and are synthesized to the charges generated in the photo sensing section 105R. After that, the synthesized charges are transferred to the CCD shift registers 110, 111, 112, and 113 by the shift gate pulse SH and transfer gate pulses TR1, TR2, and TR3 in a manner similar to those in the (G–CCD) 102.

The above transferred charges are subsequently outputted to the floating diffusion regions 118 to 121 through the output gates 114 to 117 bit by bit in accordance with the driving clocks $\phi 1$, $\phi 2$, and $\phi 2F$ at timings shown in FIG. 4. The charge outputs are converted to the voltages and are subsequently outputted through the source follower amplifiers 122 to 125 and output terminals (OSA to OSD).

In the (B–CCD) 103, the charges generated in the photo sensing section 304 are accumulated in the line shift gate 305 for a period of time of 1 H (horizontal synchronous interval) by the line shift gate pulse $\phi V_{B1}$ and are transferred to the photo sensing section 307 by the shift gate pulse $\phi SH_{B1}$ for a period of time of the next 1 H and are synthesized with the charges generated in the photo sensing section 307. After that, the synthesized charges are temporarily accumulated in the line shift gate 308 by the line shift gate pulse $\phi V_{B2}$ for a period of time of the next 1 H. The accumulated charges are transferred to the photo sensing section 105B in accordance with the shift gate pulse $\phi SH_{B2}$ for a period of time of the further next 1 H and are synthesized to the charges generated in the photo sensing section 105B. After that, the synthesized charges are outputted to the output terminals (OSAB to OSDB) in a manner similar to those in the (R–CCD) 101 and (G–CCD) 102.

FIGS. 5A to 5C show the third embodiment.

In the third embodiment, the CCDs of R, G, and B have photodiodes for a plurality of lines (in the embodiment, every two lines). A space having a width that is integer times as large as the width of one line of the photodiode is provided between the photodiodes.

That is, in all of the (R–CCD) 101, (G–CCD) 102, and (B–CCD) 103, in addition to the first photodiodes 105R, 105G, and 105B, second photodiodes 501, 504, and 507, line shift gates 502, 505, and 508 for temporarily accumulating the charges generated in the second photodiodes 501, 504, and 507 in accordance with line shift gate pulses $\phi V_R$, $\phi V_G$, and $\phi V_B$, and shift gates 503, 506, and 509 for transferring the charges accumulated under the line shift gates 502, 505, and 508 to the first photodiodes 105R, 105G, and 105B in accordance with line shift gate clocks $\phi SH_R$, $\phi SH_G$, and $\phi SH_B$ are added.

Thus, the sensitivities of the CCDs 101, 102, and 103 of R, G, and B are as follows:

R: 2.1(V/lx·sec)×2=4.2 V/lx·sec

G: 2.6(V/lx·sec)×2=5.2 V/lx·sec

B: 0.86(V/lx·sec)×2=1.72 V/lx·sec

Figure 6:
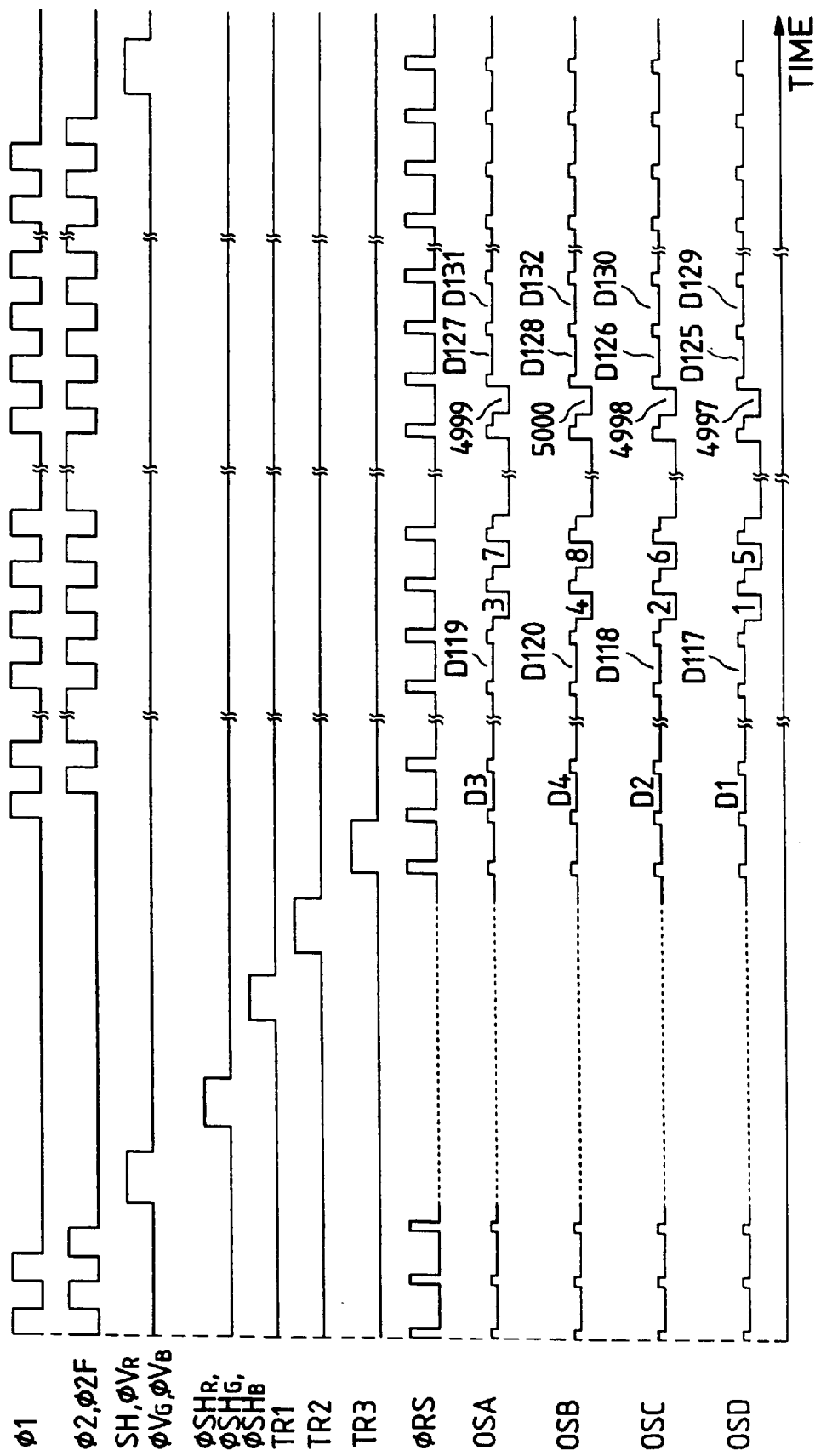
FIG. 6 is a timing chart of the third embodiment.

FIGS. 6A to 6C show timings of the driving clocks in FIGS. 5A to 5C. Since the operations to read out the charges generated in the first photodiodes 105R, 105G, and 105B to the output terminals (OSA to OSD) are the same as those in the first and second embodiments, their explanations are omitted here.

Hitherto, in case of raising the reading speed, the output signal level of the image sensor having the lowest sensitivity is insufficient due to a decrease in accumulating time, so that a sufficient S/N ratio cannot be obtained. However, according to the invention, the output signal level can be sufficiently assured, a deterioration of the image quality can be prevented, and an image of high quality can be obtained.

What is claimed is:

1. An image pickup apparatus comprising:
    m first line sensors for photoelectrically converting light of a first color, where m is an integer greater than or equal to 1;
    n second line sensors for photoelectrically converting light of a second color different from said first color, in which n is an integer larger than m,
    wherein each of said second line sensors generates an output and has a line length in a first direction and a same width in a second direction perpendicular to the first direction, and wherein said second line sensors and an object are moved relatively in the second direction by a pitch substantially equal to the width, said second line sensors being arranged in parallel in the second direction with a same space between each adjacent pair of said second line sensors being substantially equal to a predetermined multiple of said pitch; and
    synthesizing means for synthesizing, at one of the second line sensors, outputs of said second line sensors, which are output at an interval corresponding to said predetermined multiple of said pitch respectively.

2. An apparatus according to claim 1, wherein said synthesizing means comprises accumulating means for temporarily accumulating an output.

3. An apparatus according to claim 1, wherein each said first color filter is red or green and each said second color filter is blue.

4. An apparatus according to claim 1, wherein each said space is an integer multiple of said width.

5. An image pickup apparatus comprising:
    a plurality of linear image sensors formed on a single chip, each said linear image sensor comprising photoelectric converting means, a corresponding color filter which is formed on said photoelectric converting means to color separate light from an object, said photoelectric converting means converting the color separated light into electrical signals, and a corresponding reading means for reading out the electrical signals,
    wherein said linear sensor corresponding to at least one of said color filters comprises a plurality of lines of the photoelectric converting means, and
    wherein each of said lines has a line length in a first direction and a same width in a second direction perpendicular to the first direction, and wherein said linear sensor and an object are moved relatively in the second direction by a pitch substantially equal to the width, said lines being arranged in parallel in the second direction with a same space between each adjacent pair of said lines being substantially equal to a predetermined multiple of said pitch; and
    synthesizing means for synthesizing, at one of said lines, read-out electrical signals of said plurality of lines, which are output at an interval corresponding to said predetermined multiple of said pitch respectively.

6. An apparatus according to claim 5, further comprising respective accumulating means provided in each said space for temporarily accumulating the read-out electrical signals from a corresponding line of said photoelectric converting means prior to input to said synthesizing means.

7. An apparatus according to claim 5, wherein said reading means includes a CCD shift register.

8. An apparatus according to claim 5, wherein each said color filter is one of a plurality of different colors, such at least two of said color filters are different colors.

9. An apparatus according to claim 8, wherein said color filters are filters of a primary color system of R, G, and B.

10. An image pickup apparatus comprising:
    m first line sensors for photoelectrically converting light of a first color, where m is an integer greater than or equal to 1;
    n second line sensors for photoelectrically converting light of a second color different from said first color, in which n is an integer larger than m,
    wherein each of said second line sensors generates an output and has a line length in a first direction and a same first width in a second direction perpendicular to the first direction, and wherein said second line sensors and an object are moved relatively in the second direction by a first pitch substantially equal to the first width, said second line sensors being arranged in parallel in the second direction with a same first space between each adjacent pair of said second line sensors being substantially equal to a predetermined multiple of said first pitch;
    first synthesizing means for synthesizing, at one of the second line sensors, outputs of said second line sensors, which are output at an interval corresponding to said predetermined multiple of said first pitch respectively;
    k third line sensors for photoelectrically converting light transmitted through respective third color filters of a third color different from said first and second colors, in which k is an integer different from m and n,
    wherein each of said third line sensors generates an output and has a line length in the first direction and a same second width in the second direction, and wherein said third line sensors and the object are moved relatively in the second direction by a pitch substantially equal to the second width, said third line sensors being arranged in parallel in the second direction with a same second space between any adjacent pair of said third line sensors being substantially equal to a predetermined multiple of said second pitch; and
    second synthesizing means for synthesizing, at one of the third line sensors, outputs of said third line sensors, which are output at an interval corresponding to said predetermined multiple of said second pitch respectively.

11. An apparatus according to claim 10, wherein each of said first and second synthesizing means comprises respective accumulating means for temporarily accumulating an output.

12. An apparatus according to claim 10, wherein each said first space is an integer multiple of said first width.

13. An apparatus according to claim 12, wherein each said first color filter is red or green and each said second color filter is blue.

14. An image pickup apparatus comprising:
    a plurality of linear image sensors formed on a single chip, each said linear image sensor comprising photoelectric converting means, a corresponding color filter which is formed on said photoelectric converting means to color separate light from an object, said photoelectric converting means converting the color separated light into electrical signals, and a corresponding reading means for reading out the electrical signals,
    wherein said linear sensor corresponding to at least one of said color filters comprises a plurality of lines of the photoelectric converting means, and wherein each of said lines has a line length in a first direction and a same width in a second direction perpendicular to the first direction, and wherein said linear sensor and an object are moved relatively in the second direction by a pitch substantially equal to the width, said lines being arranged in parallel in the second direction with a same space between each adjacent pair of said lines being substantially equal to a predetermined multiple of said pitch;

synthesizing means for synthesizing, at one of said lines, read-out electrical signals of said plurality of lines, which are output at an interval corresponding to said predetermined multiple of said pitch respectively; and accumulating means for temporarily accumulating the read-out electrical signals from one of said lines prior to input to said synthesizing means, said accumulating means being positioned in the space between said one line and an adjacent one of said lines.

15. An apparatus according to claim 14, wherein each said reading means is a CCD shift register.

16. An apparatus according to claim 14, wherein each said color filter is one of a plurality of different colors, such at least two of said color filters are different colors.

17. An apparatus according to claim 16, wherein said color filters are filters of a primary color system of R, G and B.

18. An image pickup apparatus comprising:

m line sensors for photoelectrically converting light of a predetermined color, where m is an integer greater than or equal to two, wherein each of said line sensors generates an output and has a line length in a first direction and a same width in a second direction perpendicular to the first direction, and wherein said line sensors and an object are moved relatively in the second direction by a pitch substantially equal to the width, said line sensors being arranged in parallel in the second direction with a same space between each adjacent pair of said line sensors being substantially equal to a predetermined multiple of said pitch; and synthesizing means for synthesizing, at one of the line sensors, outputs of said line sensors, which are output at an interval corresponding to said predetermined multiple of said pitch respectively.

19. An apparatus according to claim 18, wherein said synthesizing means comprises accumulating means for temporarily accumulating an output.

20. An apparatus according to claim 18, wherein each said space is an integer multiple of said width.

* * * * *

UNITED STATES PATENT AND TRADEMARK OFFICE
CERTIFICATE OF CORRECTION

PATENT NO. : 5,841,554

DATED : November 24, 1998

INVENTOR(S) : SHIZUO HASEGAWA

It is certified that error appears in the above-identified patent and that said Letters Patent is hereby corrected as shown below:

COLUMN 2

Line 33, "CDDs" should read --CCDs--.

COLUMN 4

Line 5, "are" should be deleted.

COLUMN 6

Line 56, "TR3in" should read --TR3 in--.

COLUMN 7

Line 13, "exists" should read --exists,--.

Line 32, "105R." should read --105R. ¶--.

UNITED STATES PATENT AND TRADEMARK OFFICE
CERTIFICATE OF CORRECTION

PATENT NO. : 5,841,554

DATED : November 24, 1998

INVENTOR(S) : SHIZUO HASEGAWA

It is certified that error appears in the above-identified patent and that said Letters Patent is hereby corrected as shown below:

<u>COLUMN 9</u>

Line 2, "a" should be deleted.

Signed and Sealed this

Twelfth Day of October, 1999

*Attest:*

Q. TODD DICKINSON

*Attesting Officer*      *Acting Commissioner of Patents and Trademarks*